(12) United States Patent
Haefliger

(10) Patent No.: US 7,103,160 B2
(45) Date of Patent: *Sep. 5, 2006

(54) TELEPHONE LINE USE ENABLEMENT OF LOTTERY PARTICIPATION

(76) Inventor: William W. Haefliger, 201 S. Lake Ave., Suite 512, Pasadena, CA (US) 91101

( * ) Notice: Subject to any disclaimer, the term of this patent is extended or adjusted under 35 U.S.C. 154(b) by 0 days.

This patent is subject to a terminal disclaimer.

(21) Appl. No.: 11/150,444

(22) Filed: Jun. 9, 2005

(65) Prior Publication Data

US 2005/0226397 A1    Oct. 13, 2005

(51) Int. Cl.
*H04M 11/00*    (2006.01)

(52) U.S. Cl. .................................... 379/93.13

(58) Field of Classification Search ............. 379/93.13, 379/91.01, 91.02, 93.12, 220.01, 114.11; 463/17, 25–26, 40–41; 902/23

See application file for complete search history.

(56) References Cited

U.S. PATENT DOCUMENTS

| 4,969,183 | A | * | 11/1990 | Reese ....................... 379/93.13 |
| 5,354,069 | A | * | 10/1994 | Guttman et al. ......... 379/93.13 |
| 5,365,575 | A | * | 11/1994 | Katz ....................... 379/93.13 |
| 5,550,909 | A | * | 8/1996 | Chanda et al. ............. 379/220 |
| 5,812,765 | A |   | 9/1998 | Curtis |
| 6,117,013 | A | * | 9/2000 | Eiba ............................ 463/41 |
| 6,263,054 | B1 | * | 7/2001 | Haefliger ................. 379/93.13 |
| 6,553,104 | B1 | * | 4/2003 | Haefliger ................. 379/93.13 |
| 6,907,114 | B1 | * | 6/2005 | Haefliger ................. 379/93.13 |

* cited by examiner

*Primary Examiner*—Stella Woo
(74) *Attorney, Agent, or Firm*—William W. Haefliger

(57) ABSTRACT

A lottery is provided, requiring participants to use a telephone company's line, or line segments.

18 Claims, 1 Drawing Sheet

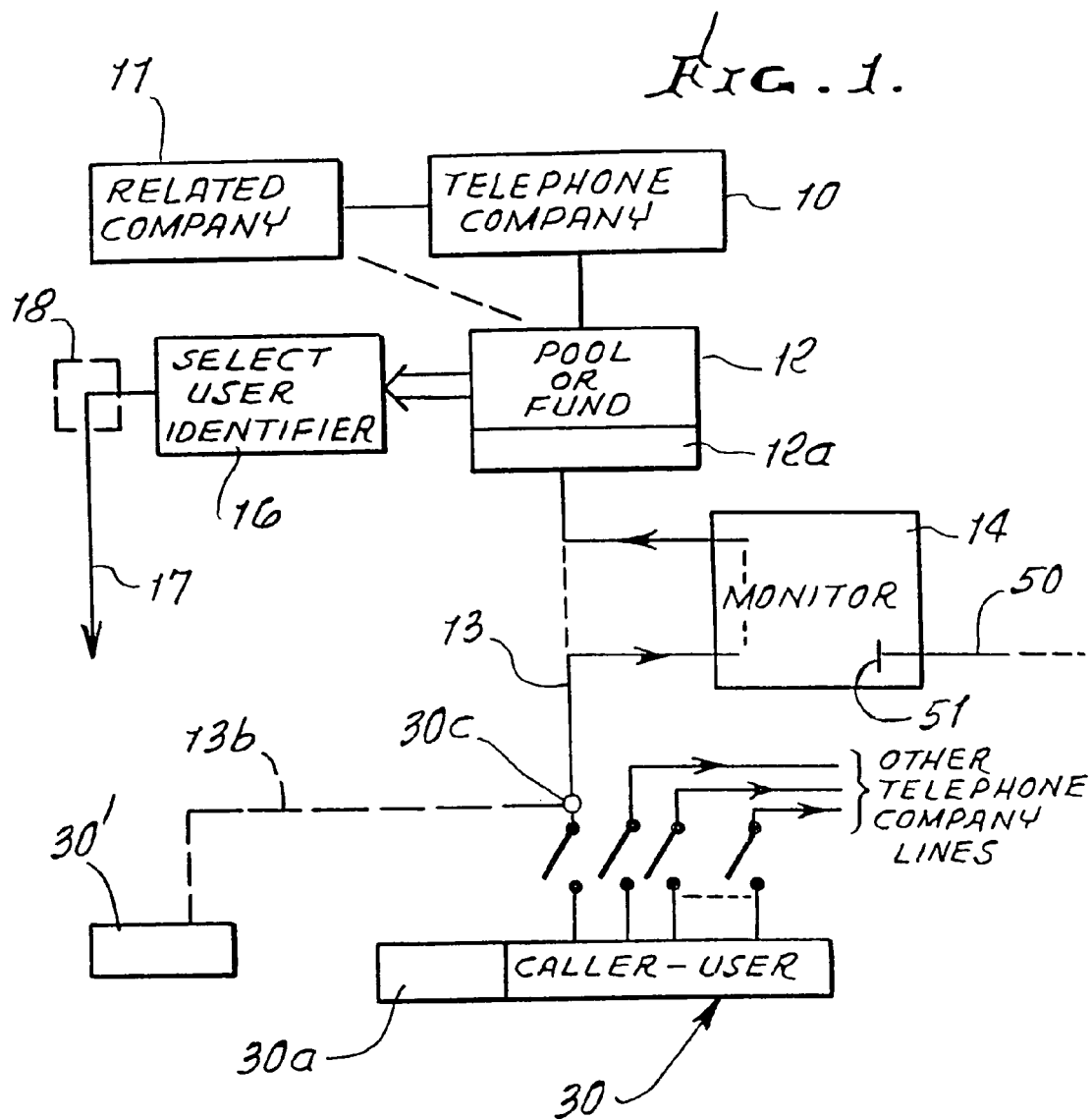
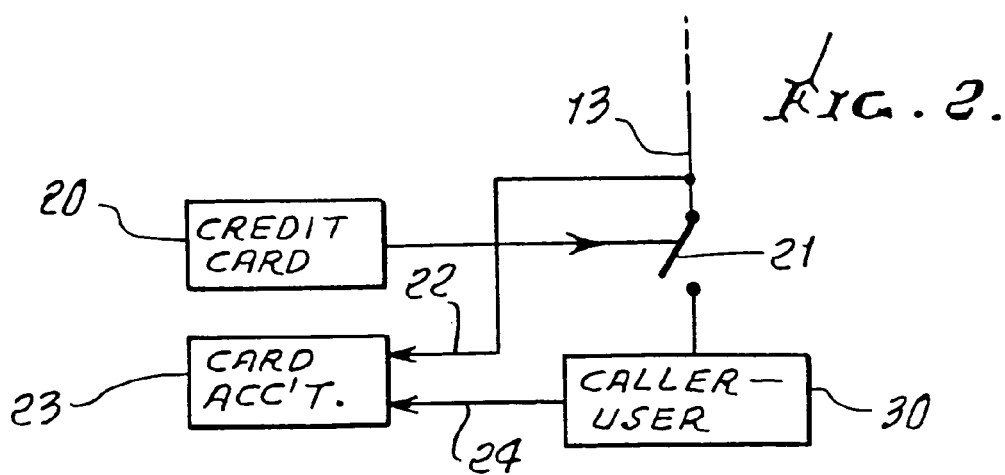

TELEPHONE LINE USE ENABLEMENT OF LOTTERY PARTICIPATION

BACKGROUND OF THE INVENTION

This invention relates generally to telecommunication, and more particularly to usage of telephone lines or links, as for example via wire or wireless.

There is need, for commercial reasons, for maintaining or increasing telephone communication, as via telephone company lines or line segments. Such need becomes acute, considering encroachment of communication as via internet users.

SUMMARY OF THE INVENTION

It is a major object of the invention to provide a business method, and system, to meet the above need. Basically, the method of the invention, for increasing or maintaining usage of a telephone company's lines, as via telephony, includes the steps:

a) establishing a lottery fund, and an associated lottery fund telephone number, b) providing a protocol by which a telephone user becomes eligible to win funds in said lottery fund, provided the following conditions are met:
  i) the user uses the telephone company's line or line segment, or connections, to make a call to said associated fund telephone number,
  ii) the user's identifier is provided and communicated to the telephone company or to said lottery fund, and c) selecting at least one such communicated user identifier from a group of such communicated identifiers, which identifies a winner of some or all of the funds in the pool or fund.

Another object is to provide for debit of the user's account with the telephone company, or selected company, by a selected amount or amounts, to provide funding for the lottery fund. That account may be a credit card account. Further, usage of the telephone company's line or line segment to make the call may require payment to the telephone company.

A further object includes monitoring incoming calls to the fund telephone number to determine whether or not they are incoming via said telephone company's line or line segment, or connections, to determine win eligibility.

Yet another object is to provide for use of the caller's pin number as the identifier which identifies a user as a potential winner of funds in the pool.

An additional object is to operate the system or method nationally, or in states where lotteries are legal.

These and other objects and advantages of the invention, as well as the details of an illustrative embodiment, will be more fully understood from the following specification and drawings, in which:

DRAWING DESCRIPTION

FIG. 1 is a preferred system and protocol method diagram, other diagrams being possible;

FIG. 2 is a diagram showing a modification of FIG. 1.

DETAILED DESCRIPTION

In the FIG. 1 diagram, a telephone company 10, or related company 11, has established a lottery type fund or pool 12, from which, or on behalf of which, a payment or payments, or other financial related benefits, are to be made to a winner or winners. The winner or winners may be selected by any criteria or method, as by random selection of an identifier associated with the winner. One such identifier is a user's pin number communicated to the fund or pool or to any other organization managing the lottery.

Lottery participant calls are made, as via a telephone line, or lines, or line segment, or segments or link, or links indicated at 13, from a call station or stations 30, and to a fund or pool telephone number or location, or related number or location, as indicated at 12a. The line segment 13 may be a long distance line. That telephone number is or may be made generally known so that participants may make such calls on 13. A monitor 14 is or may be provided, in association with incoming calls to 12a to pass or accept only those calls incoming on telephone line or link 13, it being an object of the invention to enhance usage of such lines or links. A call on another telephone company line 50 is blocked at 51.

The winner-telephone line user selection is made or selected as indicated at 16; and a consequent or related payment or payments are made to such winner or winners as indicated at 17. Payment may be made from the fund or pool 12 or from a related fund indicated at 18.

In addition, use of the telephone company's line or line segment typically requires payment to the company, or to the related company, 11 as is known and commonly provided for, as for example via user's monthly payment account with the telephone company, or via credit card or pay phone. Inasmuch as large pay-outs to winners may be made, heavy user participant use of telephone company's line or lines to the lottery is expectable, as is the experience of in-state or national lotteries, whereby the objective of increasing or monitoring telephone company line use is met or to be met. Multiple such lotteries may be operated simultaneously, or in time sequence.

FIG. 2 diagrammatically shows use by the user of a credit card in making the call to the lottery, and to pay for the call. The call is completed when an acceptable credit card 20 is used, as indicated by closing of a switch 21 in line 13. Completion of the call triggers debiting, at 22, of the card holder's account 23. Special "lottery use" credit cards may be issued by the telephone company. Also, funding of the pool, as by user-participants, may be provided, as by credit card payments or other methods. See debiting at 24 of the account 23, by the user 30, for such funding of the pool. Access, by credit card, to the lottery as via a telephone line 13 may be by the general method disclosed in U.S. Pat. No. 5,812,765, incorporated herein by reference.

Lottery call kiosks and associated circuitry or call techniques may be as provided for, as in U.S. Pat. No. 5,812,765. Such a kiosk, and associated circuitry, may be represented by numeral 30'. Such circuitry may employ dedicated lottery access lines, circuitry and methods similar to accessing the internet. Numeral 30' may also represent a hand-held wireless telephone or other movable station communicating with the lottery, over telephone company line segments.

As represented by numeral 30a, a kiosk type public access terminal, to access telephone line 13, as via the internet, indicated at 13b, connected or connectible at 30c to line 13, may, for example, include one or more of the following elements:

a) an access station, 30' and b) computer apparatus at the station and including a user keyboard and data display means, c) a user credit card reader at the station, and said computer apparatus including circuit means operatively connected to the card reader to be responsive to reading of user credit card data to enable user access to the internet via said computer apparatus at the access station, d) the access station being a public access station having an associated kiosk carrying such computer apparatus, and card reader, e) the circuit means providing a means responsive to reading of a credit card for determining if that card identifies a current account customer user whereby i) if the card does identify a current account customer user, the user is instructed via the display means to enter his password via the keyboard to enable subsequent performance of user requested operations associated with use of the internet, ii) and if the card does not identify a current account user, the user is instructed via the display means to confirm via the keyboard that a new account is to be established, and to enter new account information via the keyboard for storage by server means, and the user is then enabled to perform user requested operations, via the keyboard, and associated with the internet, f) such means responsive to reading of the credit card comprising software having the following:

i) net station first means accessed by a customer, ii) second means responsive to output of the first means to read a magnetic strip on a customer credit card, iii) third means responsive to output of the second means to determine if the customer is a current customer, iv) fourth means responsive to determined current customer output of the third means to enter a customer password, v) fifth means responsive to output of the fourth means to verify the password, vi) sixth means responsive to output of the fifth means to request user configuration from a server, vii) seventh means responsive to output of the sixth means to perform a user requested operation, viii) eighth means responsive to output of the seventh means to determine if said operation is billable.

ix) and means responsive to output of the eighth means to perform electronic billing.

The invention also contemplates a system for increasing or maintaining usage of a telephone company's lines, comprising:

a) a lottery fund, and an associated lottery fund telephone number, b) means for providing a protocol by which a telephone user becomes eligible to win funds in said lottery fund, wherein the following are provided:

i) the telephone company's line or line segment, or connections to make a call to said associated fund telephone number, ii) means to communicate a user's identifier to the telephone company or to the lottery fund, via said line or line segment, c) means to select at least one user identifier from a group of such communicated identifiers, which identifies a winner of funds in the lottery fund.

I claim:

1. A method of increasing or maintaining usage of a selected company's voice or data communication line or line segment or connections, and for accessing an established fund, there being an associated fund communication number, which includes the steps:

a) providing a protocol by which a user of said communication line or line segment or connections becomes eligible to access to said fund, wherein the following steps are provided:

i) the user uses said selected company's communication line or line segment, or connections to make a call to said associated fund communication number, ii) the user's identifier is provided and communicated to said selected company or to the fund, and b) monitoring incoming calls to said associated fund communication number to determine whether or not they are incoming on said selected company's communication line or line segment or connections, c) and effectively blocking usage for access to the fund of calls incoming on communication lines other than said company's communication line or line segment or connections, thereby excluding access to the fund of said calls on said other communication lines.

2. The method of claim 1 wherein the identifier is the user's pin number.

3. The method of claim 1 wherein the user uses a credit card in making the call.

4. The method of claim 1 wherein the user's account with the selected company is debited by a selected amount or amounts to provide funding.

5. The method of claim 4 wherein said account is a credit card account.

6. The method of claim 1 wherein usage of the selected company's communication line or line segment or connections to make said call require payment to the selected company.

7. The method of claim 6 including using a credit card to make call payment to the communication company, or to make a payment to the fund.

8. The method of claim 1 wherein said line or line segment is a telephone circuit long distance line or line segment.

9. The method of claim 1 including providing a Kiosk, or Kiosks, or stations, from which said calls may be made.

10. The method of claim 1 including providing a portable telephone hand set to make said call or calls, via a telephone company line or lines, or line segment.

11. The method of claim 1 wherein a link via said line or line segment is made by providing an internet link.

12. The method of claim 1 which includes providing a movable station from which calls to said line or line segment are to be made.

13. The method of claim 12 including providing at said movable station means responsive to reading of a credit card for determining if the card identifies a current account customer user.

14. The method of claim 12 wherein said movable station is a portable telephone.

15. The method of claim 12 including providing a wireless link between said movable station and said line or line segment.

16. The method of claim 12 including using a credit card to establish user identification.

17. A system for increasing or maintaining usage of a company's voice or data communication line or line segment and connections, with respect to a fund, there being an associated fund communication number, comprising:

a) means for providing a protocol by which a user of said communication line or line segment or connections becomes eligible to access funds in said fund, b) a monitor to screen or monitor an incoming call or calls to the fund communication number to determine whether or not said call or calls are incoming on said company's communication line or a line segment or connections, c) and means for effectively blocking usage for access to the fund of calls incoming on communication lines other than said company's communication line or line segment or connections, thereby excluding access to the fund of said calls on said other communication lines.

18. The system of claim 17 including a station from which said calls are to be made, and which comprises one of the following:
  i) a kiosk
  ii) a movable station
  iii) a portable telephone
  iv) a credit card reader station.

* * * * *